United States Patent Office 3,849,481
Patented Nov. 19, 1974

3,849,481
HYDROGENATION OF LYSINE PRECURSORS
Robert Fuhrmann, Morris Plains, Fred W. Koff, Clifton, and John Pisanchyn, Morristown, N.J., assignors to Allied Chemical Corporation, New York, N.Y.
No Drawing. Continuation-in-part of application Ser. No. 97,290, Dec. 11, 1970. This application Dec. 29, 1971, Ser. No. 215,962
Int. Cl. C07c 103/18
U.S. Cl. 260—501.17                    7 Claims

ABSTRACT OF THE DISCLOSURE

A method for preparing D,L,-lysine amide, and salts thereof, by the hydrogenation of 2-oximino-6-nitrohexanamide, in the presence of hydrogen, hydrogenation catalyst, and ammonia or a carboxylic acid.

CROSS-REFERENCES TO RELATED APPLICATIONS

This application is a continuation-in-part of our co-pending application, Ser. No. 97,290, filed Dec. 11, 1970, and is also related to co-pending, commonly assigned applications, attorney's docket no. P.D. File 7000–915, filed Oct. 14, 1971 and Ser. Nos. 852,947 and 852,881, both filed Aug. 25, 1969.

BACKGROUND OF THE INVENTION

This application relates to a novel catalytic method of hydrogenating the D,L,-lysine precursor, 2-oximino-6-nitrohexanamide, to produce lysine amide, which may be readily hydrolyzed to produce D,L,-lysine.

L,-lysine (2,6-diaminohexanoic acid), is a dibasic amino acid essential to life and therefore of great value not only as a food supplement but as an additive to animal feed. In the course of the last quarter century it has been produced industrially at a constantly increasing rate with a corresponding drop in cost.

Although obtained as a mixture of two optical isomers (D and L lysine), generally only L,-lysine may be metabolized.

Many methods have been reported for synthesizing the amino acid, but they commonly employ routes and raw materials too costly for economical production.

Several of the synthetic routes to D,L,-lysine involve the catalytic hydrogenation of various precursors, but in the case of most of them, low yields in this reduction step contribute greatly to the overall costs of the entire synthesis.

As part of the route to the chemical production of D,L,-lysine, the present invention relates to a novel method of reducing the lysine precursor, 2-oximino-6-nitrohexanamide by catalytic hydrogenation.

SUMMARY OF THE INVENTION

In our co-pending application, Ser. No. 97,290, filed December 11, 1970, the D,L,-lysine precursor, 2-oximino-6-nitrohexanamide, also known as 2-oximino-6-nitrocaproamide, was disclosed.

The instant invention relates to:
A. A catalytic method of hydrogenating this precursor (2-oximino-6-nitrohexanamide) to produce lysine amide base in good yield using anhydrous ammonia as a solvent, and Raney nickel or Raney cobalt as the catalyst, and
B. A catalytic method of hydrogenating this precursor (2-oximino-6-nitrohexanamide) to produce D,L,-lysine amide salts in good yield using a carboxylic acid, such as acetic acid, as a solvent, and one or more of the noble metals as the catalyst. The precursor, 2-oximino-6-nitrohexanamide, is obtainable from low cost raw materials and is itself an intermediate in the production of lysine from cyclohexanone.

There is a wealth of data in the prior art on the reduction of the individual functional groups, —NO$_2$, oxime and —CONH$_2$, but it is quite unexpected to be able to reduce the compound, 2-oximino-6-nitrohexanamide,

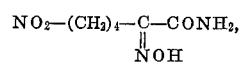

which has all three reactive functional groups present in the molecule, and in the relative position in which they are found. It is well known that the position of these functional groups in the molecule determines the ease of intramolecular reactions as opposed to intermolecular reactions. There are a number of reactions that can be expected to take place if an attempt is made to hydrogenate such a molecule, and it would normally be supposed that the reduction reaction to produce lysine amide by a hydrogenation procedure, would be so overwhelmed by the production of ring compounds and side reaction products, that lysine amide, if obtainable at all, would be found in impractically small amounts. Surprisingly, we have found a method of catalytically reducing 2-oximino-6-nitrohexanamide which suppresses the production of the unwanted compounds, normally expected, and permits the production of lysine amide in yields of 80% of theory or better.

In the production of lysine amide base we use Raney nickel or Raney cobalt and anhydrous ammonia as a solvent. As will be explained later, the use of this solvent is important to the successful reduction of the 2-oximino-6-nitrohexanamide to produce lysine amide in good yield. Catalytic systems previously developed for the hydrogenation of amino amide precursors, or for the hydrogenation of simple oximes, do not give satisfactory results with this substrate.

In the production of lysine amide salts, we use a supported noble metal catalyst; such catalysts as rhodium, palladium, or rhodium and palladium, supported on carbon, being preferred. Carboxylic acids are used as solvents, acetic acid, being quite satisfactory.

In either method, pipecolinamide, a product of intramolecular cyclization, is the major by-product. When carrying out the hydrogenation in a carboxylic acid solvent, we have found that the presence of appreciable amounts of water increases the amount of pipecolinamide by-product, at the expense of the lysine amide yield. The amount of water produced, and correspondingly, the amount of by-product formation, may be correlated with the ratio of carboxylic acid used with respect to the 2-oximino-6-nitrohexanamide starting material. The greater the relative amount of 2-oximino-6-nitrohexanamide, the greater the amount of by-product formation.

In the hydrogenation of 2-oximino-6-nitrohexanamide (I) lysine amide (II) is obtained:

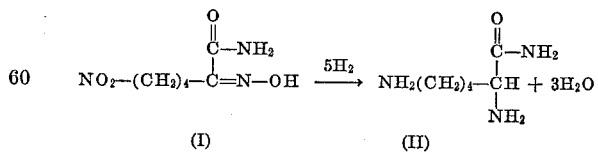

In the case of the reaction carried out in a carboxylic acid solvent, acid catalyzed cyclization can conceivably take place to produce α-oximino caprolactam. This reaction would be acid catalyzed and would probably be accelerated at temperatures in excess of 80° C.

Other side reactions include: the formation of an imino group by the hydrogenolysis of the oxime group. The 2-imino-6-aminohexanamide thus formed, can cyclize and be hydrogenated to produce the by-product pipecolinamide, probably by way of the intermedate piperidine-2-amino-2-carboxamide. Alternately, either the imine group or the oxime group can be hydrolyzed to produce a keto group, and the 2-keto-6-aminohexanamide so formed can, in the presence of hydrogen, also convert to the by-product pipecolinamide, probably through the intermediate 1,2-tetrahydropyridine-2-carboxyamide.

The amount of pipecolinamide:

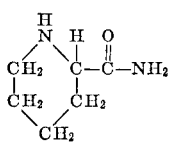

formed during the hydrogenation as a by-product, can be minimized by carrying out the hydrogenation in the presence of ammonia according to one embodiment of the present invention. This brings about the recycle of any keto compound formed, to the imino stage, and the ammonia competes with the terminal amino group in the attack on the imino group.

In the other embodiment of the present invention, wherein the hydrogenation is carried out in a carboxylic acid solution, the production of pipecolinamide is also minimized by immobilizing the terminal amino group through salt formation or acylation. The amide group can also be subject to acylation. Acylation is not preferred since it leads to diacyl lysine or mixtures of various acylated products. Under the operating conditions disclosed in the instant invention, however, substantially no acylation takes place.

Salt formation is quite satisfactory as a means of minimizing by-product production. Side reactions such as the hydroysis of the oxime and imine functional groups can be minimized, and the cyclization reaction which leads to the production of pipecolinamide, may thus be kept under control.

During the production of lysine amide by the methods of this invention it is important to exclude oxygen in order to prevent solubilization of the catalyst, with attendant metallic contamination of the lysine amide product. It is interestnig to note that such diverse compounds as ammonia and the carboxylic acids of this disclosure, the first base, the others acidic, reacting with the lysine amide precursors, should, when serving as a reaction medium, function to achieve a common purpose, namely that of suppressing side reactions. This on its face, demonstrates the unpredictability of the use of such compounds to achieve an unexpected result. They share the ability to sharply increase the yield and minimize the formation of contaminating by-products.

DESCRIPTION OF THE PREFERRED EMBODIMENT

A high pressure, agitated, reaction vessel is charged with 100 parts by weight of 2-oximino-6-nitrohexanamide and about 2 to 200 parts, preferably about 10 to 150 parts of active Raney nickel or Raney cobalt catalyst. By "Raney" catalyst, we mean that type of nickel or cobalt catalyst well known in the art, which is prepared from an alloy of nickel or cobalt and aluminum, by dissolving out the aluminum with caustic soda solution to leave a highly active catalyst of spongy nickel or cobalt. The vessel is then thoroughly purged with an inert gas, cooled, and charged with about 200 to 10,000 parts, preferably about 350 to 2,000 parts by weight of liquid anhydrous ammonia. While the reaction vessel is still cold it is next pressurized to about 50 to 15,000 p.s.i.g., preferably between 1,000 and 3,000 p.s.i.g. with hydrogen gas. The reactor is then brought to a temperature of between 15 and 150° C., preferably between 50 and 120° C. with constant agitation, and maintained within this temperature range for about 0.1 to 20 hours, preferably for a period of about 3 to 15 hours. After cooling the contents of the reactor, it is vented, a suitable solvent such as methanol is added, and the contents filtered. The catalyst remaining on the filter may be reused a number of times with or without make-up. The crude lysine amide is recovered on evaporating the filtrate.

The crude lysine amide product is analyzed by subjecting an aliquot portion to hydrolysis, esterification and trifluoro acetylation, then to gas-liquid chromatography. The yield of lysine amide is consistenly found to be in the order of 80% of theory, with approximately 15–20% of pipecolinamide as by-product. The mole percentage composition of the crude product is substantially the same, since no unreacted 2-oximino-6-nitrohexanamide remains. Further details on the analytical method will be found in Example 1 to follow.

In the case of these hydrogenations, the presence of air has to be carefully avoided in order to prevent solubilization of the catalyst with attendant contamination of the lysine amide product by nickel or cobalt complexes.

In the second embodiment of the present invention, carboxylic acid salts of lysine amide are also obtained in yields of over 80% of theory. Although a Raney nickel or cobalt catalyst could be used as in the first embodiment, it has been found preferable, in view of the acid medium, to use a catalyst comprising rhodium or palladium or a mixture thereof, on a support such as carbon, barium sulfate, titanium oxide or thorium oxide, preferably carbon, wherein the metallic catalytic agent represents between 0.1 and 20%, preferably 1.0 to 15% of the supported catalyst. Whether or not these catalysts are supported is not critical to this hydrogenation. Furthermore, when a supported catalyst is used, the selection of the support, or the percent rhodium or palladium on the support, is also not critical. Catalysts prepared from platinum are also effective. The reaction vessel is charged with 100 parts of 2-oximino-6-nitrohexanamide and about 0.5 to 100 parts, preferably about 1 to 50 parts by weight of the selected catalyst.

Next, the reactor is charged with between about 210 and 10,500 parts of a carboxylic acid such as acetic, formic, propionic, isobutyric, or neopentanoic acid, preferably glacial acetic, and preferably in the amount of between 350 and 2,100 parts by weight. The vessel is thoroughly purged of oxygen by means of an inert gas. The reaction vessel is then pressurized with hydrogen gas to between 15 and 15,000 p.s.i.g., preferably between 75 and 3000 p.s.i.g. Following this, the reactor is brought to a temperature of about 15° to 150° C., preferably 50 to 120° C., and maintained at this temperature for about 0.1 to 20 hours, preferably for 3 to 15 hours. After cooling the reaction mixture to about ambient temperature it is vented and filtered to obtain a solution of the carboxylic acid salt of lysine amide and to remove the catalyst for possible re-use or recovery. As in the first embodiment, the catalyst may be re-used a number of times to good effect. The acetic acid is then evaporated, preferably under reduced pressure, and preferably at a temperature no greater than 60 °C., to obtain the crude carboxylic acid salt of lysine amide.

The product is hydrolyzed, esterified and trifluoroacetylated, then subjected to gas-liquid chromatography. The yield of the acetic acid salt of lysine amide is consistenly found to be in the order of 80% of theory, with approximately 15 to 20% of pipecolinamide as by-product. The mole percentage composition of the crude is substantially the same since no unreacted 2-oximino-6-nitrohexanamide remains.

Example 1

The reactor employed in this example consists of a 45 ml. Parr general purpose screw cap bomb fabricated of T-303 stainless steel, Model #4712. Within the bomb is a Teflon-coated, serrated piston-type agitator, magnetically activated externally, and controlled by a Wilson repeat-cycle timer to provide any required degree of agitation. Heat is supplied to the bomb by a constant temperature silicone oil bath.

The reactor is charged with 0.5263 grams of 2-oximino-6-nitrohexanamide and 0.66 grams of methanol-wet #27 Raney active cobalt catalyst (dry weight, 0.56 grams) and after attaching the screw cap, the reactor is purged of air. This is done by pressurizing the bomb with nitrogen to about 15 p.s.i.g., venting, and repeating the procedure to a total of five pressurizations. The reactor is then cooled in a Dry-Ice-acetone bath to about $-77°$ C. and charged with a slight excess of anhydrous ammonia over the intended charge. This excess is vented, thus serving as a further purge of the system and leaving 8.8 grams of anhydrous ammonia as the charge. While still cold the reactor is pressurized to 1,650 p.s.i.g. with pure hydrogen gas.

The reactor is next brought to 100° C. by immersion in the constant temperature bath, agitation is initiated, and the reduction of the 2-oximino-6-nitrohexanamide is allowed to proceed at 100° C., with agitation, for seven hours. The pressure during the hydrogenation remains at about 2,100 p.s.i.g.

After the hydrogenation the reaction product is cooled to about ambient temperature. The reactor is vented, the ammonia is allowed to evaporate, and a small amount of a suitable solvent such as methanol is added. The quantity of solvent is not critical. The solution is filtered to remove the catalyst, which is rinsed with the solvent used. The filtrate and wash then is made up to a standard volume such as 100 cubic centimeters (cc.), and an aliquot portion taken for analysis. The recovered catalyst is held for re-use in subsequent runs. The analytical procedure applied to the sample of product solution is briefly as follows:

The aliquot sample of crude product weighing about 130 to 200 milligrams is dried over $P_2O_5$, then charged into a 3 oz. Fisher & Porter aerosol compatibility tube, and treated with 5 cc. of a 4N solution of anhydrous HCl in methanol. A Teflon closure and Teflon valve is used, and the magnetically controlled agitator employed while the tube is heated in an oil bath for 1 hour at 100° C. The methanol is then flash-evaporated directly from the tube in a flash evaporator. 8 cc. of methylene chloride and 2 cc. of trifluoroacetic anhydride are added to the contents of the tube, which is closed as before, and agitated for 15 minutes until solution is substantially complete. Now the tube is heated to 150° C. for 10 minutes, then cooled, and to it is added from a pipette a solution consisting of 3 cc. of a 3% solution of octadecane in toluene, which serves as an internal standard.

The gas chromatograph employed:

F & M 500, with WX filaments.
Column 6' x ¼" stainless steel.
SE-30—30% on chromosorb W.
Programmed temperature: 115

$$\xrightarrow{7.9°/min.} 240° C.$$

Injection temperature: 250° C.
Detector temperature: 350° C.
He flow: 105 cm.³/min.

The crude product is found to contain 81.3 mole percent lysine amide, 12.7 mole percent pipecolinomide as by-product, and traces of three other unidentified by-products.

The Raney cobalt catalyst which was recovered, is washed and re-used in subsequent batches.

Examples 2 to 6

In these examples the same apparatus and method is employed as detailed in Example 1. Variations in the conditions and results are tabulated below.

| Example numbers | 2 | 3 | 4 | 5 | 6 |
|---|---|---|---|---|---|
| Charge: | | | | | |
| 2-oximino-6-nitrohexanamide (grams) | .528 | .529 | .533 | 5.34 | .530 |
| Ammonia anhyd. (grams) | 8.8 | 8.8 | 9.0 | 9.0 | 9.0 |
| Methanol wet #27 Raney cobalt catalyst (grams) | 0.86 | 0.78 | 0.82 | 0.79 | 0.87 |
| Dry weight of above catalyst (grams) | 0.69 | [1] 0.67 | [1] 0.66 | [1] 0.64 | [1] 0.62 |
| Variables (hydrogenation): | | | | | |
| Time (hours) | 5 | 5 | 5 | 5 | 5 |
| Temperature, ° C | 100 | 100 | 100 | 100 | 100 |
| Initial H₂ pressure (p.s.i.g.) | 1,100 | 1,200 | 1,300 | 1,200 | 1,200 |
| Pressure during hydrogenation (p.s.i.g.) | 1,650 | 1,650 | 2,000 | 1,800 | 1,900 |
| Crude product: | | | | | |
| Mole percent lysine amide | 77.00 | 84.3 | 81.5 | 82.3 | 76.5 |
| Mole percent pipecolamide | 17.3 | 15.7 | 17.3 | 14.6 | 17.1 |

[1] In each run so marked, the catalyst is recovered from the preceding run.

Example 7

In this example, the same reactor is employed as described in Example 1.

The reactor is charged with 1.003 grams of 2-oximino-6-nitrohexanamide, 0.303 grams of a catalyst consisting of 5% rhodium on carbon and 10 cc. of glacial acetic acid. The reactor cap is then fixed in place, and the reactor purged with nitrogen as described in Example 1. It is then pressurized with hydrogen to 1200 p.s.i.g. and heated with agitation in the constant temperature bath at 75° C. for 5 hours. The reactor is next cooled to ambient temperature, vented, and the contents filtered to remove the catalyst. The acetic acid solution is flash evaporated at reduced pressure and at a maximum temperature of 60° C. using a Buchler Rotary Flash Evaporator to remove the acetic acid and obtain the crude product. This crude product is hydrolyzed, esterified, and trifluoroacetylated as in Example 1, then subjected to gas-liquid chromatography. The crude product is found to contain 83.3 mole percent lysine amide and 17.3 mole percent pipecolinamide.

Examples 8 to 10

In these examples, the same apparatus and method is employed as detailed in Example 7. Variations in the conditions and results are tabulated below:

| Example numbers | 8 | [1] 7 | 9 | 10 |
|---|---|---|---|---|
| Charge: | | | | |
| 2-oximino-6-nitrohexanamide (grams) | 0.1295 | 1.003 | 1.506 | 2.005 |
| Catalyst, 5% Rh on C (grams) | 0.037 | 0.303 | 0.450 | 0.600 |
| Glacial acetic acid (cc.'s) | 10 | 10 | 10 | 10 |
| Variables: | | | | |
| Time (hours) | 3.0 | 5.0 | 5.0 | 5.0 |
| Temperature ° C | 75 | 75 | 75 | 75 |
| Pressure during hydrogenation (p.s.i.g.) | 90 | 1,200 | 1,200 | 1,150 |
| Grams of oximinonitrohexanamide per 100 cc.'s of glacial acetic acid | 1.3 | 10 | 15 | 20 |
| Crude product: | | | | |
| Mole percent lysine amide | 77.6 | 83.3 | 76 | 65.5 |
| Mole percent pipecolinamide | 19.4 | 17.3 | 20.5 | 34.4 |

[1] Example 7, previously described, is included here again, for comparison.

The comparatively low pressure recorded during the hydrogenation in Example 8 is included to illustrate the fact that high pressures are not required. It is quite significant, in that it demonstrates that a good molar ratio between the product and by-product, and good yields can be obtained without resorting to high pressures, a fact of special interest when practical commercial production is contemplated. Note should be taken of the correlation between the ratio of the raw material (2-oximino-6-nitrohexanamide to the carboxylic acid (acetic) charge. As the ratio increases, the concentration of water produced by the reaction increases, and the ratio of product to by-product decreases. Water in the reaction mix is conductive to side reactions and by-product formation.

Example 11

The reactor employed in this example consists of a 3 ounce Fisher and Porter Aerosol Compatibility Tube containing a Teflon-coated magnetic, externally activated and controlled agitator.

The reactor is charged with 0.406 grams of 2-oximino-6-nitrohexanamide, 0.082 grams of a catalyst comprising 5% palladium on carbon, 0.082 grams of 5% rhodium on carbon and 40 cc. of glacial acetic acid. After attaching the head of the tube, the apparatus is purged of air by the method of Example 1, consisting of pressurization with nitrogen at 15 p.s.i.g., followed by venting. The reactor is then pressurized to 80 p.s.i.g. with pure hydrogen gas and maintained at 75° with agitation in a heated silicone oil constant temperature bath for 3 hours. After venting the reactor the catalyst is separated and the crude product treated as in Example 7. The product is found to consist of 80 mole percent lysine amide and 20 mole percent pipecolinamide. The yield of the acetic acid salt of lysine amide is also found to be 80% of theory. In all these runs, since no detectable unreacted 2-oximino-6-nitrohexanamide remained, and only crude product was obtained from the reactor after removal of the catalyst and solvent, the mole percent of product and by-product was substantially equivalent to the yield based on theory.

Since certain changes may be made in carrying out the above process, without departing from the scope of the invention, it is intended that all matter contained in the above description shall be interpreted as illustrative and not in a limiting sense.

We claim:

1. A process for the catalytic reduction of 2-oximino-6-nitrohexanamide to produce an alkanoic acid salt of D,L-lysine amide, comprising: subjecting 2-oximino-6-nitrohexanamide, an alkanoic acid containing 1–5 carbon atoms and hydrogen in the presence of a rhodium metal hydrogenation catalyst, to superatmospheric pressure, at a temperature above 15° C. to convert the 2-oximino-6-nitrohexanamide to said alkanoic acid salt of D,L-lysine amide.

2. The process as claimed in claim 1 wherein the carboxylic acid is present in the amount of between 3.5 and 21 times the weight of the 2-oximino-6-nitrohexanamide; and the hydrogen gas is pressurized to between 15 and 15,000 p.s.i.g.

3. The process as claimed in claim 1 wherein the alkanoic acid is glacial acetic acid, and the hydrogen gas is pressurized to between 75 and 3,000 p.s.i.g.

4. The process as claimed in claim 1 wherein the catalyst is deposited on a supporting material selected from the group consisting of carbon, barium sulfate, titanium oxide, and thorium oxide.

5. The process as claimed in claim 1 wherein between 0.1% and 20% of the catalyst is deposited on carbon as a support.

6. The process as claimed in claim 1 wherein the dry catalyst is present in an amount equal to between .005 and 1.0 times the weight of the 2-oximino-6-nitrohexanamide, and the hydrogenation is carried out with agitation over a period of between about 0.1 and 20 hours, at a temperature of between about 15° and 150° C.

7. The process as claimed in claim 1 wherein the catalyst is present in an amount equal to between about .01 and 0.5 times the weight of the 2-oximino-6-nitrohexanamide, and the hydrogenation is carried out with agitation for a period of between 3 and 15 hours.

References Cited

UNITED STATES PATENTS

| | | | |
|---|---|---|---|
| 3,681,460 | 8/1972 | Pisanchyn et al. | 260—534 L |
| 2,999,875 | 9/1961 | Ferris et al. | 260—534 L |
| 2,876,218 | 3/1959 | Francis et al. | 260—534 L |

FOREIGN PATENTS

| | | | |
|---|---|---|---|
| 39,687 | 12/1970 | Japan | 260—534 L |

HOWARD T. MARS, Primary Examiner

M. W. GLYNN, Assistant Examiner

U.S. Cl. X.R.

260—293.86, 534 L, 561 A